UNITED STATES PATENT OFFICE.

WILHELM HAMPE, OF CLAUSTHAL, GERMANY.

MANUFACTURE OF ZINC PIGMENTS.

SPECIFICATION forming part of Letters Patent No. 594,948, dated December 7, 1897.

Application filed April 6, 1897. Serial No. 631,021. (No specimens.)

*To all whom it may concern:*

Be it known that I, WILHELM HAMPE, of Clausthal University, Clausthal, Hanover, in the Empire of Germany, have invented certain new and useful Improvements in the Manufacture of Zinc Pigments; and I do hereby declare that the following is a full, clear, and exact description of the invention, which will enable others skilled in the art to which it appertains to make and use the same.

It is well known that zinc oxid can be colored by certain metallic oxids, and pigments so constituted have been known in the arts for a considerable time.

The object of the present invention is to obtain such zinc pigments in a cheaper and more convenient manner than heretofore.

According to this invention I obtain a thoroughly-intimate mixture of sulfate of zinc and a sulfate of a metal whose oxid is to be the source of the color of the pigment, (hereinafter referred to as the "sulfate" of the coloring metal.) This intimate mixture is thoroughly commingled with finely-comminuted carbon, preferably wood-charcoal, and the mixture so obtained is heated to a carefully-gaged temperature of 650° centigrade. It has previously been discovered that when an intimate mixture of dehydrated zinc sulfate and finely-comminuted carbon is heated to this carefully-gaged temperature a chemical change, resulting in the formation of zinc oxid, proceeds according to the equation

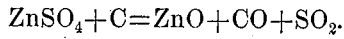
$$ZnSO_4 + C = ZnO + CO + SO_2.$$

When in addition to sulfate of zinc there are present the sulfates of certain metals whose oxids color zinc oxid, it has been discovered that the sulfate of such metal is also converted into oxid and a pigment results.

In carrying out this invention I proceed as follows: I dissolve the quantity of the sulfate of the coloring metal required for a given charge in about four times its weight of water and add this solution to crystallized zinc sulfate. The solution of the sulfates obtained (by heating, if necessary) is evaporated and the mixture of the sulfates dehydrated. The dehydrated mixture of the sulfates is then mixed with finely-comminuted carbon and heated as described above. It has been found to be advantageous to allow the oxids to continue glowing at a low heat in a current of air for some time after the disengagement of sulfurous acid has ceased.

The best results have so far been obtained by using as the sulfate of the coloring metal the sulfates of nickel, cobalt, manganese, and iron. In some cases mixtures of two of these sulfates with zinc sulfate have been employed. In others only one such sulfate mixed with zinc sulfate has been used. By varying the proportions of the sulfate of the coloring metal or metals relatively to the zinc sulfate pigments of varying shades have been produced, and according as one or other of the sulfates or a mixture of two was used pigments of different colors have been produced.

Having stated the nature of my invention, I will further illustrate it by giving an account of the sulfates of the coloring metals employed in obtaining pigments and describe the variations in color or shade of color which can be obtained by varying the nature of the sulfate of the coloring metal employed or by employing mixtures of two sulfates of coloring metals in varying proportions. I premise, however, that these details are given only by way of illustrating the application of the invention, and I do not limit myself to them.

Green pigments with a shade of blue are obtained when sulfate of cobalt is employed as the sulfate of the coloring metal. The proportions used were, for one thousand kilograms of crystallized zinc sulfate, in one case 6.16 kilograms of crystallized sulfate of cobalt and in another case twice this quantity—viz., 12.32 kilograms—in a third case, for the same proportion of crystallized zinc sulfate, 15.4 kilograms of the sulfate of cobalt, and in a fourth case 30.8 kilograms were used.

In obtaining green pigments with a yellow shade sulfate of nickel together with sulfate of cobalt were employed as the sulfates of the coloring metals. Here the proportions in which the sulfates were employed were the following: for one thousand kilograms of crystallized zinc sulfate nine kilograms of crystallized sulfate of nickel and 30.8 kilograms of sulfate of cobalt in one case and fifteen kilograms of sulfate of nickel and 46.2 kilograms of sulfate of cobalt in another case.

When sulfate of manganese together with sulfate of cobalt are used, the shade of the pigment is olive. The precise shade of olive varies according to the total quantity of these sulfates employed in proportion to that of the crystallized zinc sulfates, and, further, varies according to the proportions, *inter se*, in which the sulfates of manganese and cobalt are used. In one case the proportions used were 12.32 kilograms of sulfate of cobalt and 6.16 kilograms of crystallized sulfate of manganese to one thousand kilograms of crystallized sulfate of zinc.

Yellow pigments with a greenish shade are obtained when sulfate of nickel is used as the sulfate of the coloring metal. The nickel sulfate was in one case in the proportion of three kilograms to one thousand kilograms of the crystallized zinc sulfate and in another case in the proportion of twelve kilograms to one thousand kilograms of the crystallized zinc sulfate.

Yellow to brownish pigments are obtained when sulfate of manganese is employed as the sulfate of the coloring metal. The proportions which have been employed are, for one thousand kilograms of crystallized sulfate of zinc, three, six, nine, twelve, and fifteen kilograms of crystallized sulfate of manganese.

In obtaining reddish pigments sulfate of iron has been used as the sulfate of the coloring metal. The proportions which have been employed are, for one thousand kilograms of crystallized sulfate of zinc, nine, fifteen, and thirty kilograms of crystallized sulfate of iron.

Grayish-green pigments are obtained when sulfate of cobalt and sulfate of iron are used together as sulfates of coloring metals. These sulfates have been employed in the following proportions: for one thousand kilograms of crystallized zinc sulfate 30.8 kilograms of sulfate of cobalt and thirty kilograms of sulfate of iron.

In the production of the more delicately-tinted pigments it is advisable to purify the zinc sulfate to be used, and for this purpose the following method has been adopted: Finely-levigated zinc oxid is stirred into the solution of zinc sulfate and chlorin gas passed into the liquid, (or a saturated solution of chlorin gas in water is added.) When a sufficient quantity of chlorin is present and by continuous stirring the zinc oxid is obtained in a finely-divided state in the solution, the iron, cobalt, and manganese which may be present as an impurity are within a few hours precipitated as sesquioxids and peroxids, respectively. The precipitate which gradually settles down contains in addition such portion of the oxid of zinc as has not gone into solution as chlorid of zinc. If an unnecessarily large proportion of zinc oxid has been avoided and the iron has been for the most part previously removed, the precipitate is mainly composed of cobalt, sesquioxid, and manganese dioxid. After filtering in the filter-press the precipitate may be used in producing chlorin, to be employed as described. For this purpose the precipitate is treated either with hydrochloric acid or with a mixture of sulfuric acid and common salt.

Having now particularly described and ascertained the nature of my said invention and in what manner the same is to be performed, I declare that what I claim is—

The herein-described method or process of obtaining pigments, consisting in preparing an intimate mixture of dehydrated sulfate of zinc and of one or more of the sulfates of such metals whose oxids are capable of imparting a color other than white to zinc oxid, commingling the mixture of sulfates so prepared with finely-comminuted carbon, and subjecting the whole to a carefully-gaged temperature of 650° centigrade substantially as described.

WILHELM HAMPE.

Witnesses:
JULIUS TECKEL,
WILHELMINE EY.